(No Model.)
4 Sheets—Sheet 1.

R. D. HUME.
CAN MAKING MACHINE.

No. 528,673.
Patented Nov. 6, 1894.

Witnesses:

Inventor,
Robert D. Hume
By Dewey & Co.
Attys (No Model.) 4 Sheets—Sheet 2.
R. D. HUME.
CAN MAKING MACHINE.
No. 528,673. Patented Nov. 6, 1894.
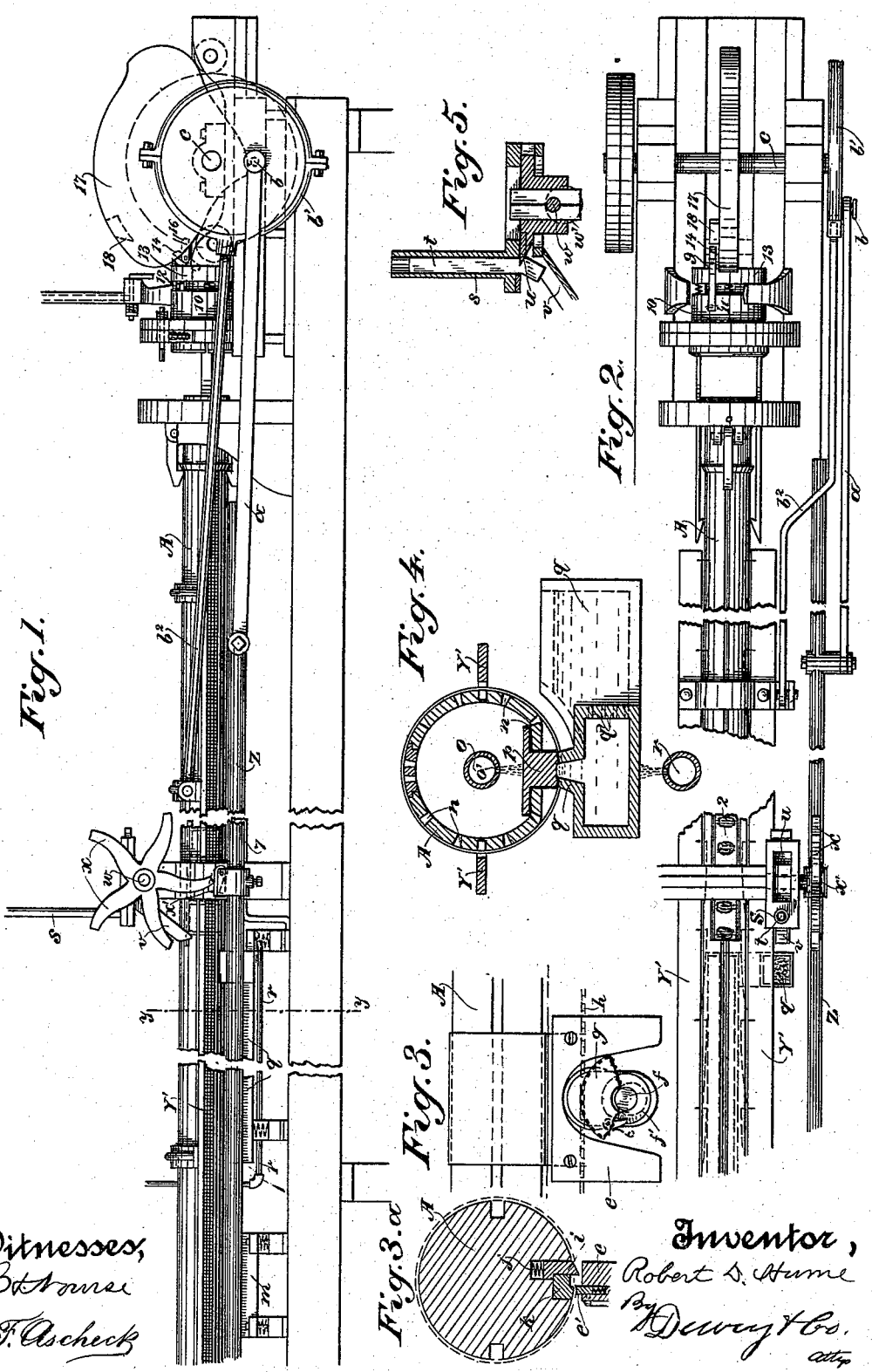

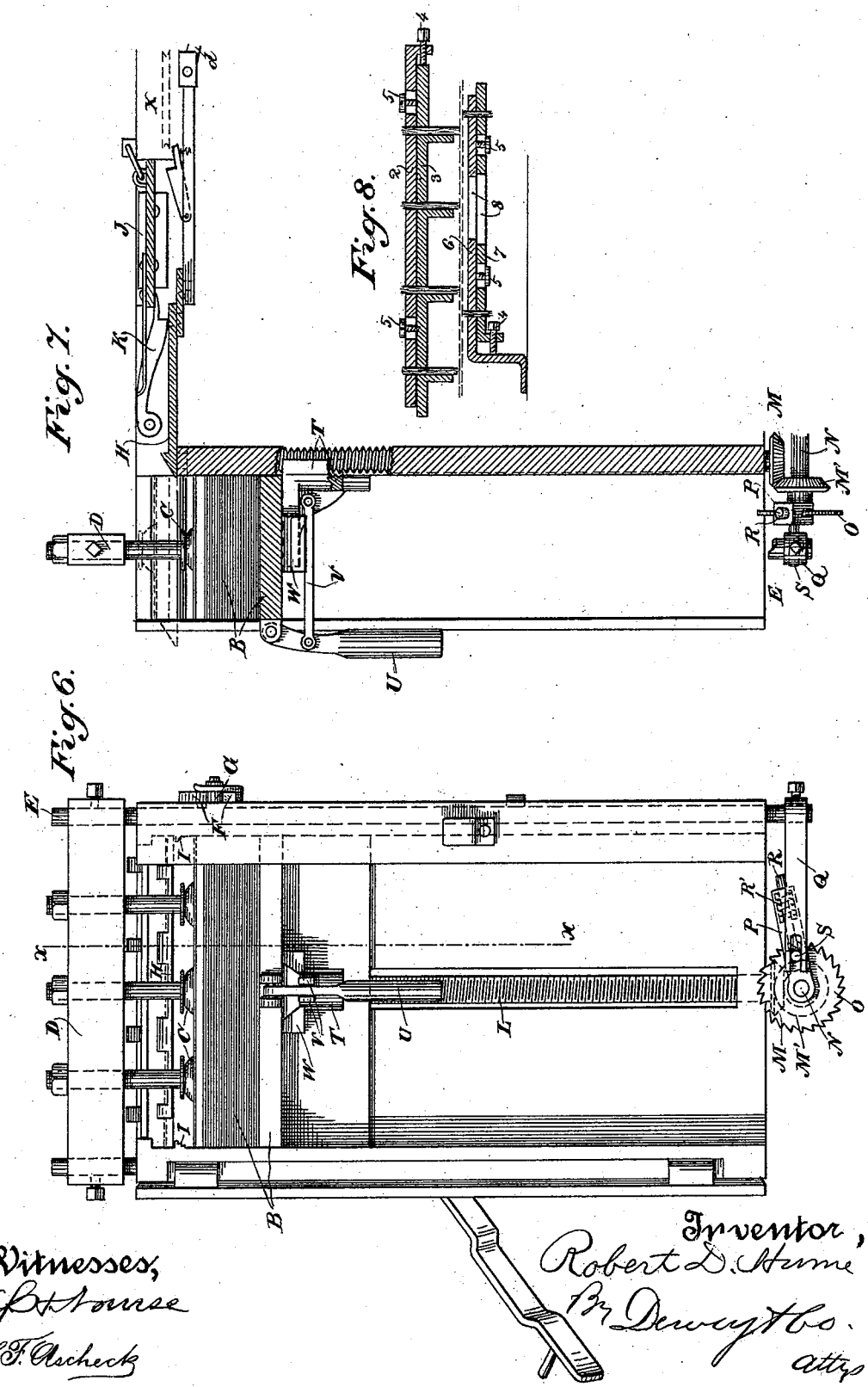

(No Model.) 4 Sheets—Sheet 4.

R. D. HUME.
CAN MAKING MACHINE.

No. 528,673. Patented Nov. 6, 1894.

Witnesses,
*[signatures]*

Inventor,
Robert D. Hume
By Dewey & Co.
Atty.

ated November 6, 1894.

UNITED STATES PATENT OFFICE.

ROBERT D. HUME, OF GOLD BEACH, OREGON.

CAN-MAKING MACHINE.

SPECIFICATION forming part of Letters Patent No. 528,673, dated November 6, 1894.

Application filed March 28, 1894. Serial No. 505,454. (No model.)

*To all whom it may concern:*

Be it known that I, ROBERT D. HUME, a citizen of the United States, residing at Gold Beach, Curry county, State of Oregon, have invented an Improvement in Can-Making Machines; and I hereby declare the following to be a full, clear, and exact description of the same.

My invention relates to can making machines.

It consists in a novel mechanism, combination of parts, and certain details of construction which will be more fully explained by reference to the accompanying drawings, in which—

Figure 1:
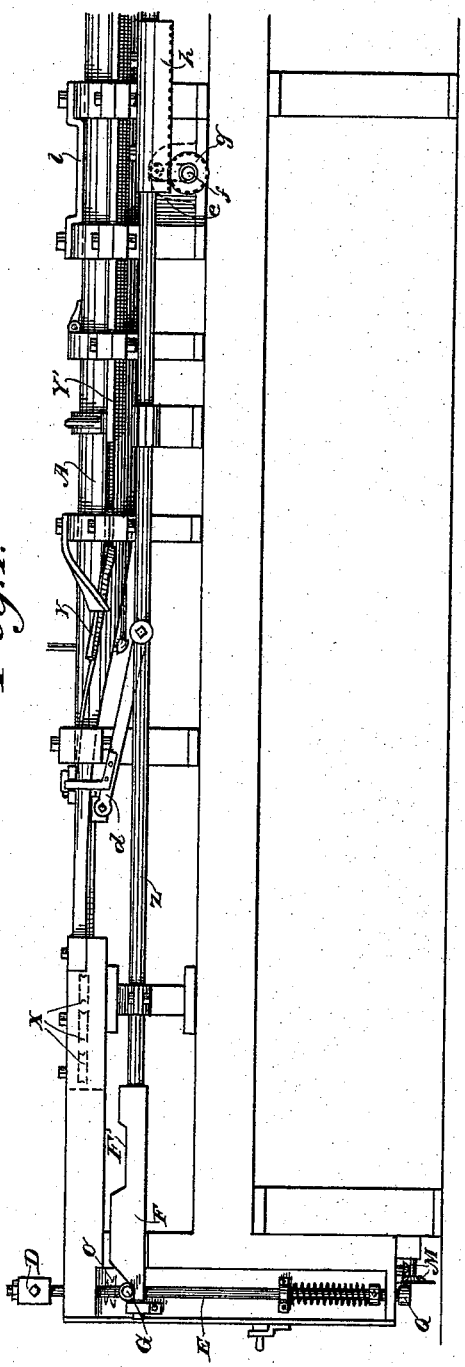
Figure 2:
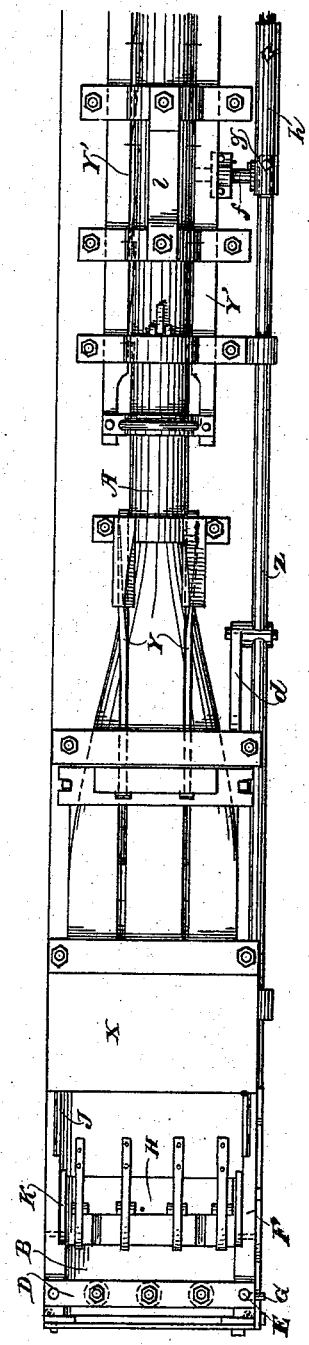
Figure 9:
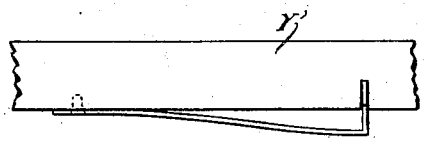
Figure 10:
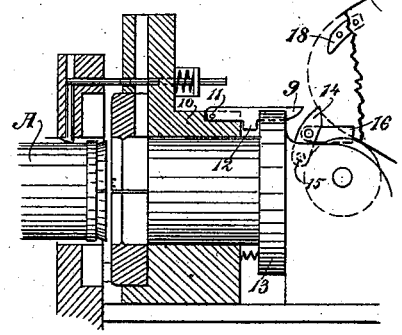
Figure 11:
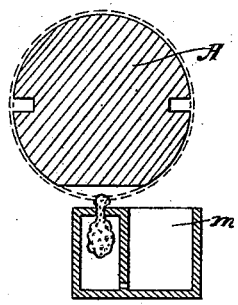
Figure 12:
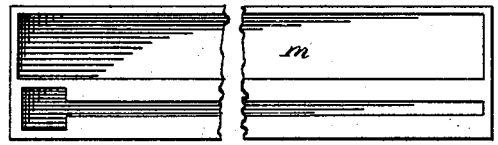
Figure 13:

Figure 1 (Sheets 1 and 2) is a side elevation of the apparatus. Fig. 2 (Sheets 1 and 2) is a plan view of the same. Fig. 3 is a sectional view of the pinion, rack, pawl and the eccentric which operates the seam closing device. Fig. 3ª is a transverse section of the horn showing seam guides and compressing device. Fig. 4 is a transverse section on line $y$—$y$ of Fig. 1, showing the solder carrier and iron, and the hollow sleeve over which the can body passes between the soldering surfaces while being soldered, also the gas jet tubes for heating the soldering devices. Fig. 5, is a vertical section taken through the solder supply tube and cutter at one side of the solder tank, and in a plane parallel with the line of travel of the cans. Fig. 6 (Sheet 3) is an end view showing the devices for feeding the sheets of tin to the apparatus. Fig. 7 is a vertical longitudinal section of the same, on line $x$—$x$ of Fig. 6. Fig. 8 is a longitudinal section of the wipers. Figs. 9 and 13 (Sheet 4) are views of part of a carrier bar and spring. Fig. 10 is a section of heading mechanism with stop latch. Fig. 11 is a transverse section of the horn and acid tank. Fig. 12 is a plan view of the acid tank.

In my invention I employ a former A around which the sheet of metal is bent from a flat state, and curved as it advances until it is in the form of a cylinder around the cylindrical horn or extension, into which the former A merges.

The sheets of tin are cut to the proper size and are placed upon a supporting table as shown at B. Above these sheets of tin are a series of lifters C. These lifters are adapted to adhere to the metallic sheet beneath them when depressed upon it, and when raised will lift it by reason of the adhesion, thus separating the top sheet from those which lie below it as shown in Fig. 6. These lifters have shanks attached to a transverse bar D, and are adjustable with relation thereto, and this bar is reciprocated up and down by means of a vertical rod E which is actuated by a horizontally reciprocating cam plate F, the upper edge of which passes beneath a projecting pin with anti-friction roller shown at G.

The upper edge of the plate F has the end adjacent to the pin G, beveled so that when the plate is forced beneath the pin, the rod and the lifters will be raised until the uppermost sheet of metal is lifted above the carrier H, and when the latter is advanced, it passes beneath the sheet of tin thus lifted until the hook at the outer end has passed beyond the edge of the sheet, the pin G meantime traveling upon the straight upper edge of the plate F. As soon as the hook of the carrier has passed beyond the edge of the sheet of tin, the pin G drops into a depression in the upper edge of the plate shown at F', and this allows the lifters and the sheet of metal to drop so far that the edge of the sheet of tin will then be engaged by the hook ends of the carrier H when it commences to retract, and the retraction of the carrier draws this sheet of tin away from the lifters and advances it toward the former by which it is to be eventually shaped.

In order to prevent a second sheet of metal from adhering and being lifted with the uppermost one, I have shown small projecting corrugations I which are here proportionately enlarged, but which in practical use are just sufficient to disengage any second sheet which may adhere, while not sufficient to disengage the uppermost sheet from the lifters.

When the carrier H is retracted, it carries the sheet of tin back with it, and the sheet is guided and held in place by means of a spring-actuated plate J in the side of its path, which keeps it perfectly secure in its channel.

K is a stop pawl, the end of which drops behind the edge of the sheet of tin when it has been advanced by the carrier H, and this prevents the sheet from being moved forward again, when the carriers again advance.

In order to elevate the table and the pile of metal sheets which lie upon it, so that the uppermost one will always be at the proper height to be taken by the lifters, I have shown a vertical screw L which turns in a suitable nut and has fixed to it a bevel gear M which is actuated by a bevel gear M' upon the horizontal shaft N. This shaft carries upon it a ratchet wheel O, and a lever arm P has one end loosely journaled upon the shaft N so as to swivel about it, the ratchet turning in a slot in the arm. This arm P is connected by a pin S with the arm Q which is secured to the lower end of the vertical reciprocating rod E and projects toward the shaft N as shown in Fig. 6.

Within the lever P is a sliding pawl R having a spring R' behind it which causes the point of the pawl to engage with the teeth of the ratchet wheel O.

When the rod E and the arm Q are raised, the lever P will be turned about its fulcrum point on the shaft N and the pawl R will move over the teeth of the ratchet without advancing it, but when the parts are relieved and the rod E and the lifters are allowed to drop by gravitation when the cam plate F is retracted, the pawl carrying lever P will be moved downward by means of a pin S which enters a slot in the end of the arm Q, and as the pawl R is in engagement with the teeth of the ratchet O, the latter will be rotated a short distance, and through the gears M and M' will act to turn the screw L.

The thread of the screw L and the distance to which it is advanced are so calculated that each advance will raise the table carrying the sheets of tin the thickness of one sheet, thus keeping the upper surface of the sheets constantly at the same distance from the lifters, and the table will thus be raised intermittently until all the sheets upon the table have been lifted and removed.

If the thickness of the sheets of metal vary, or the pitch of the screw advances them upwardly too fast, the lifters will not drop as far, and as the rod E and arm Q partake of this motion, their stroke will be so shortened that the feeding mechanism will not be actuated until the pile of sheets has been reduced to the proper height.

When it is necessary to depress the table to receive another supply of sheets it is done by disengaging the half nut T which is fixed to the lower side of the table and engages the screw L. This engagement is produced by means of a lever U and a connecting rod V shown in Fig. 7 which connects the lever U with the half nut T, and the latter is adapted to slide in guides as shown at W so as to be withdrawn clear of the screw threads, and the table may then be depressed to the desired point after which the lever U is released, and the nut again engages the screw rod for further operation.

When the sheet of tin has been advanced by the carrier H and prevented from returning by the pawl K, the carrier H again moves to receive another sheet of tin. When it is again retracted, the first sheet of tin is again advanced by reciprocating carriers and delivered between devices shown at X (Fig. 1) in dotted lines, by which the edges of the sheet of tin are turned over into a hook form to be subsequently engaged and form the side seam of the can.

As these devices have been fully described in a previous patent issued to myself, I make no further description of them here, as they form no part of my present application.

In my former patents I have shown the forming device A with the curved side at the bottom, and the carriers so operating as to fold the sheet of metal upwardly around the former, and bring the hook edges of the sheet together above the former, thus making the seam upon the top of the horn.

In my present device I have reversed the apparatus, and have placed the curved side of the former uppermost, and the carriers Y slide in grooves or channels made in a spiral manner along the sides of the horn as shown in Figs. 1 and 2, so as to engage the edges of the sheet of metal and advance it intermittently while it is at the same time gradually curved around the former as described in my former patents.

The carriers previous to those shown at Y are actuated by a reciprocating rod Z which extends along the side of the apparatus traveling in suitable guides and it is connected by a connecting rod or pitman $a$ with a crank pin or eccentric $b$ driven by the main driving shaft $c$ which in the present case I have shown at the end of the machine opposite to that at which the sheets are fed in. This rod Z also connects with and actuates the reciprocating plate F by which the lifters are actuated, and it is connected with the carriers H by means of a connecting rod or pitman $d$.

The sliding carriers Y have outwardly projecting spring-actuated latches which engage the rear edges of the sheets of metal to advance them, and which move outwardly to allow the latches to pass over the sheets when the carriers Y reciprocate in the opposite direction.

As the sheets are closed together around the cylindrical horn into which the former merges, the hook edges of the sheets are caused to pass each other by the action of the converging former, which closes them together, and by the elasticity of the sheet the hooks are caused to interlock when relieved from the inward pressure after the can body has passed that part of the former by which it was closed together. The can body thus formed is then advanced until it reaches the hammer or closing device shown in Fig. 3ª. This consists of a vertically reciprocating bar $e$ which is actuated by an eccentric or cam $f'$ upon a horizontal shaft $f$ extending transversely beneath the horn at this point. Upon the outer end of this shaft is a gear $g$ which is engaged by a rack $h$ driven upon the reciprocating rod Z, and as the rod and rack reciprocate, the gear, and the shaft will be turned so that the cam or eccentric lifts the hammer $e$ so as to press the seam closely together.

$i$ (Fig. 3ª) is a bar let into the horn and having behind it a spring $j$ which acts to normally force the bar out, and the particular angle which is formed by the beveled edge of the bar acts as a guide to hold the seam in proper place as the can body is moved along into position for the seam to be closed.

The bar $k$ which is let into the lower side of the horn has a groove or channel made in it adjacent to the edge of the guide $i$, and when the hammer or closing bar $e$ is brought up to press the seam together, it also presses the seam into this groove or channel so that the seam projects in the interior of the can, leaving the exterior a smooth and continuous cylindrical surface. Above the horn at this point is a bar $l$ of sufficient rigidity so fixed as to resist the pressure which is brought to bear beneath the horn to close the seam. The presser bar $e$ has also a guide $e'$ upon it which projects upwardly upon the opposite side from the beveled guide $i$, and this acts upon the opposite side to keep the seam in place until it has been properly closed.

After leaving the seam closing device, the can body passes over the acid tank $m$ which is supported upon springs so as to allow it to yield slightly downwardly. This tank has a slot in the top and fixed in it a piece of sponge or other absorbent material, which being fixed in the slot and projecting upwardly above it, carries sufficient acid so that as the seam is moved over the sponge, the acid will be properly applied to it, and the tank yields sufficiently to accommodate itself to the passing can body, at the same time being held by the springs so that the acid will be properly applied. After leaving the acid tank, the can body is carried on to the soldering mechanism. The horn, at this point beyond the acid tank, is continued in the form of a hollow cylindrical sleeve or continuation having perforations made in the sides as shown at $n$ (Fig. 4). Through the center of this hollow continuation extends the gas pipe $o$ having openings or jets $o'$ on the lower side for the escape of gas, and the perforations in the outside of the horn admit a sufficient amount of air for proper combustion. The lower part of the horn at this point is channeled longitudinally, and within this channel lies the soldering iron $p$ which is here shown in the form of a T, the shank of which projects down through the slot or channel in the bottom of the horn, while the projecting arms at the top lie upon the interior of the flattened portion of the horn as shown in Fig. 4. When a can body is in position, around this portion of the horn, the bottom of the shank of the soldering iron is in position to rest upon the seam on the interior of the can, and when the can has passed beyond it, the soldering iron rests upon the top of the solder carrier $q$ which is supported upon springs beneath the horn and soldering iron and is heated by jets from a gas tube $r$ situated beneath it. This solder carrier is closed all around, and has an upwardly projecting longitudinal ridge just beneath the soldering iron with a narrow slot so that when the solder is melted within the solder carrier, the upper surface forms a slight protrusion through this slot, and in this melted material the soldering iron lies when no can is in position beneath it, thus taking up a small portion of solder, and when the can passes between the iron and the carrier, the iron is drawn over the seam in the interior of the can and applies the solder to it, while the corresponding ridge of the carrier, simultaneously applies the solder to the outside of the same.

The solder does not overflow in the slot of the carrier, for the reason that the supply of solder to the carrier through the tank is so regulated that this slot is just kept full, and the upper surface, when exposed, has the rounded protruding form of a similar body of mercury by reason of its cohesive attraction. The small amount of solder thus exposed temporarily through the narrow slot in the top of the solder carrier, enables me to use pure tin which is a greater advantage in this class of work for soldering purposes, because the atmosphere has little or no opportunity to come in contact with the metal and thus oxidize it.

In order to keep the requisite amount of solder in the carrier I have shown a device for supplying it which consists of a tube $s$ through which the bar of solder $t$ slides by gravitation. Across the lower end of this tube works a reciprocating cutter $u$ which acts to sever a small piece of solder at each reciprocation and this severed piece slides down through a chute $v$, and falls into the exterior portion of the solder carrier which is open at the top to receive it. The amount cut off at each stroke of the cutter is regulated by the distance the bar of solder is allowed to move down for a cut. Small holes $q'$ from this exterior portion, admit the solder into the interior closed portion previously described, and as fast as it melts the level of the solder is kept up within the slot in the top of the carrier.

As heat is applied to the outer tank or receptacle, it will be manifest that the solder will be melted therein and will flow thence through the holes into the inner chamber or carrier, and it is within this chamber that it is especially protected from oxidation, because it is entirely inclosed above the surface, except the slot in the top, and this latter is also closed by the soldering iron except when a can passes between the iron and the solder in the slot, when the can temporarily performs the same office. This prevents oxidation of the strip of solder which is to be applied to the cans, and keeps it always clean and bright at this point.

*s* is the vertical tube into which is dropped the soldering stick *t*, its lower end resting in the chute V. A reciprocating frame carries a knife *u* in its forward end, and is guided between two plates. The frame is reciprocated by means of a cam or eccentric or crank pin *w'* fixed on the end of the shaft *w*. Whenever a can is pushed forward the lugs *x'* will push one of the arms *x* forward, and coming back the former will be depressed on account of having an incline formed on its top, and it will be brought up again by a spring. After five cans have passed the shaft will have completed one revolution by reason of the five arms of the star which are successively acted on, and the knife will have advanced and severed a piece of the soldering stick which slides down into the receptacle *q*.

The radial arms *x* project into the line of travel of the reciprocating bar Z, and a lug *x'* projecting from it engages one of the arms of the star at each reciprocation. This lug has a spring beneath it which holds it up so that it will engage the arm of the star when moving in one direction, but the spring allows it to be depressed to pass beneath the arm as it returns for the next stroke.

In order to have access to the interior of the hollow horn or sleeve at the point where the soldering iron is located, I have shown a section at the top made removable.

The wipers for the inside seam are made of asbestos fiber clamped between plates 2 and 3, adjustable by a screw 4, and locked together to hold the wipers by screws 5. The outside wipers are similarly clamped between plates 6 and 7, and these have open slots 8 through which any surplus solder may fall.

In my present apparatus I have shown two sets of carriers the first one previously described, actuated by the pitman *d*, and the reciprocating rod Z moves the self feeder, the hammer mechanism and the solder cutter. The other which is actuated from an eccentric *b'* and a connecting rod *b²* moves the carriers Y' by which the can is advanced intermittently through the various operations which are performed upon it.

The mechanism for placing the head upon the can is essentially the same as that described in my Patent No. 488,476, dated December 20, 1892, for Can-Body Forming Machines. I have in the present case made a slight improvement in the mechanism shown in said former patent, which consists of a swinging latch 9 connected with the head carrier and reciprocating plunger by which the mechanism is actuated that operates to crimp the head upon the end of the can. This latch is hinged to the carrier 10 and 11, and has a lug 12 projecting between the end of the carrier, and the flange 13 of the plunger. This lug prevents the two from being pressed together when power is applied to the outer end of the plunger to advance the two while the head is placed upon the end of the can. After the head has thus been placed upon the can end, it is necessary to release the latch in order to allow the plunger to advance far enough to actuate the mechanism by which the head is crimped upon the end of the can. The outer end of the latch is rounded off, and a plate 14, with a similarly rounded end, is hinged at 15, and has a bar 16 attached to it. Upon the cam 17 which actuates the plunger, is a lug 18 which at the proper instant strikes the end of the bar 16, and presses it and the hinged plate 14 forward until the end of the latter strikes the rounded end of the latch 9 and forces it up so as to lift the lug 12 and allow the advancing cam to force the plunger the remaining distance to complete the work. As soon as the cam recedes, springs act to separate the plunger from the carrier, and the lug 12 again falls between them and locks them for another advance.

Having thus described my invention, what I claim as new, and desire to secure by Letters Patent, is—

1. In a can making machine, a can body former, a horn about which the sheets are bent, a mechanism for feeding the sheets of tin to be delivered to the former, consisting of adherent lifters, a mechanism by which they are reciprocated so that the uppermost of a pile of sheets will be lifted from the others by each reciprocation, and a horizontally reciprocating carrier adapted to move beneath the lifted sheet and receive and withdraw it horizontally without destroying the adhesion of the lifter until the sheet has passed the edge when the carrier is retracted.

2. In a can making machine, a series of vertically moving adherent lifters adapted to lift the uppermost of a series of sheets, a horizontally reciprocating carrier, mechanism by which it is moved beneath the lifted sheet, said carrier having hooks or lugs which engage the edge of the sheet so as to withdraw it horizontally without destroying the adhesion of the lifters until the sheet is withdrawn beyond their edges when the carrier is retracted, and a pawl or stop by which the sheet is engaged after it has been removed from the lifters to prevent its being returned when the carrier is again advanced.

3. The vertically moving lifters adapted to lift successively the uppermost of a series of sheets, a bar in which the shanks of said lifters are fixed, a vertically reciprocating rod connected with the bar, and a horizontally reciprocating plate, the upper edge of which forms a cam movable beneath a pin or stud upon the vertical rod, whereby the reciprocation of the cam first raises the lifters and the sheet, while the carrier passes beneath the lifted sheet, then drops the lifters and sheet, so that its edge may be engaged by the upturned hooks of the carrier and the sheet removed from the lifters when the carrier is reciprocated.

4. A feeding mechanism for sheets of tin consisting of a vertically moving table adapted to receive the sheets, adherent lifters vertically movable above the table and the sheets thereon, adapted to raise the uppermost sheet and deliver it to a horizontally reciprocating carrier, a vertical screw rotating in a nut connected with the table, a lever and pawl and ratchet mechanism actuated by direct connection through the rod E with the vertically moving lifters, and bevel gears by which said motion is transmitted to rotate the screw at each movement of the lifters.

5. A feeding mechanism for sheets or blanks, consisting of vertically reciprocating adherent lifters adapted to seize and lift the uppermost of a pile of sheets or blanks from the table upon which they are supported, mechanism by which the table is gradually raised to compensate for the removal of the sheets, consisting of a vertical screw, a gear on said screw, a horizontal shaft having a gear engaging the screw gear, a ratchet on the horizontal shaft and a pawl engaging said ratchet, a half nut slidable in horizontal guides upon the table engaging the screw, a lever U and a rod V connecting with the nut whereby the latter may be disengaged from the screw to allow the table to be moved.

6. A feeding mechanism for sheets or blanks, consisting of vertically reciprocating adherent lifters adapted to seize and lift the uppermost of a pile of sheets or blanks from a table upon which they are supported, mechanism whereby said lifters are reciprocated, and devices consisting of plates with teeth or notches I upon each side of the pile of sheets adapted to arrest and detach any sheet below the uppermost one which may be lifted therewith.

7. The vertically moving adherent lifters by which the sheets are singly and successively raised from the pile of blanks, a horizontally reciprocating carrier, a mechanism whereby it is advanced beneath the lifted sheet, mechanism consisting of the reciprocating cam plate F whereby the lifters and sheet are depressed simultaneously so that the latter is engaged by hooks upon the carrier whereby it is removed from the lifters when the carrier is again retracted.

8. The adherent vertically moving lifters adapted to raise sheets or blanks singly and successively from a pile situated beneath the lifters, a horizontally reciprocating carrier and mechanism whereby it is advanced beneath the lifted sheet, mechanism whereby the sheet is engaged by the carrier and removed from the lifters by the retraction of the carrier, and elastic guides J between which the sheet is moved as the carrier retracts whereby it is registered to enter the hook forming mechanism as described.

9. The reciprocating carrier adapted to receive sheets or blanks singly and withdraw them from the point where received, pawls or stops engaging the rear edges of the sheets to prevent their return upon the return movement of the carrier, and the reciprocating rods Z connected with the carrier at one end and with the crank upon the driving shaft at the other whereby the sheets are advanced by intermittent movements from the point where they are received, to be submitted to the future forming operations as described.

10. In a can making machine, a horizontally reciprocating carrier, devices for supplying sheets of tin singly thereto, mechanism whereby the carriers are intermittently reciprocated, mechanism for bending the edges of the sheets into hooks, a former forming a continuation in line with the carrier or table over which the sheet first moves, having its surface curving gradually into a convex form upon the upper side, with the curvature increasing until it merges into a cylindrical horn, carriers by which the sheet is advanced and bent around said form until the hook edges interlock beneath the cylindrical horn, and a mechanism consisting of a vertically reciprocating hammer whereby the interlocked edges are closed together beneath the horn.

11. The former around which the sheets of metal are curved, mechanism by which they are intermittently advanced along the former, a cylindrical horn into which the former merges and about which the sheets are bent so that their hook edges are interlocked beneath the cylindrical horn, a vertically reciprocating hammer adapted to close the interlocked edges and form a seam, guide bars extending along upon opposite sides of the seam and set respectively into the cylindrical horn and the reciprocating hammer with springs whereby they are forced outwardly into position to receive and guide the seam, said springs yielding to allow the guides to be forced inwardly when the seam is closed by the approaching hammer.

12. A mechanism for closing the seam beneath the horn and projecting the closed seam upon the interior of the can body, consisting of a channel formed longitudinally in the lower side of the horn and in line with the seam, spring-actuated retractile guides between which the seam is retained in line with the channel, a vertically reciprocating hammer and mechanism whereby it is actuated to close the interlocked edges of the seam and force the seam thus closed into the channel in the horn.

13. The seam closing mechanism consisting of the horn around which the sheet of metal is bent and the previously formed hooks upon its edges interlocked beneath the horn, a channel formed in the horn for the reception of the seam, retractile guides between which the opposite edges of the seam are retained, a vertically reciprocating hammer adapted to close and compress the seam into the channel, mechanism whereby the hammer is actuated consisting of a cam or eccentric mounted upon a shaft beneath the hammer, a pinion fixed to the shaft and a reciprocating rack engaging said pinion and rotating the shaft and cam to actuate the hammer.

14. A seam closing mechanism consisting of the channeled horn, retractile guides, and vertically reciprocating hammer adapted to close and compress the seam, and an anvil or resisting plate fixed above the upper side of the horn to counteract the pressure thereon.

15. The cylindrical horn about which the sheets of metal are curved, interlocked, and the seam closed, and a hollow continuation of said horn having a slot in the lower side, a soldering iron suspended with its lower edge projecting through the slot, a gas jet pipe extending through the hollow horn having jet burners with flame impinging upon the top of the iron, and perforations around the periphery of the tubular extension for the admission of air to support the combustion of the burners.

16. The hollow cylindrical extension of the horn having a channel in the lower side, a soldering iron suspended therein with its lower edge projecting through the channel and standing in line with the seam of the can which is carried upon the exterior of the extension, an interior gas jet tube whereby the iron is heated, a solder carrier having an open slotted ridge upon the top through which the solder is exposed and upon which the iron rests when no can is passing between them, and a heating device therefor.

17. In a can making machine, a soldering device consisting of a soldering iron suspended in the cylindrical extension of the horn about which the can bodies are formed, so that its lower edge projects through a slot in the bottom of said extension, and a solder carrier having a slotted ridge upon its upper side through which the melted solder is exposed, and upon which the lower edge of the soldering iron rests when no can is passing, and mechanism whereby the can bodies are advanced to pass between the two solder carrying surfaces so that the solder is simultaneously applied to both inside and outside of the seam.

18. In a can making machine, the hollow cylindrical extension of the horn about which the can bodies are formed, a soldering iron suspended in the slotted lower side of said extension projecting through the slot, means for heating said iron from the interior of said horn, a solder carrier yieldingly supported and heated from below, having a slotted ridge upon its upper side opposing the lower edge of the soldering iron and forming contact therewith when no can is passing, said iron and solder carrier yielding to be separated when the can body is passed between them whereby solder is applied simultaneously to both sides of the seam.

19. In a can making machine, the horn about which the body is formed and the seam closed upon the lower side, a device for applying acid to the seam after it has been closed consisting of a tank supported upon springs and adapted to contain acid, said chamber having a slot in the upper side in line with the seam, and an absorbent material fixed in said slot with its lower side dipping in the acid and the upper side projecting to form contact with the opposing seam.

20. In a can forming machine, a horn about which the can is formed, a spring supported acid tank with absorbent material projecting through a slot in the upper side in the line of travel of the passing seam whereby the acid is applied to the seam of the can, and a slot or channel made in the lower part of the horn opposed to the acid tank to prevent the acid from acting upon the horn when no cans are passing.

21. The solder carrier consisting of the covered chamber having an upwardly projecting slotted ridge through which the solder is exposed, and a means for heating the carrier, and melting the solder therein, an open tank or chamber or extension at one side of the closed carrier, and a mechanism whereby solder is supplied thereto to keep a constant level within the slotted opening.

22. A covered solder carrier with a narrow slit in the top through which molten solder is exposed in the line of travel of the seam of the can moving above the solder carrier, an open extension or tank at one side, a reciprocating cutter and mechanism for actuating said cutter at intervals to supply pieces of solder to the open chamber, and a heater beneath by which the solder is melted and a surface level maintained approximately level with the top of the slot in the carrier.

23. A solder carrier and an open chamber connected therewith, a feed chute through which solder is delivered and a reciprocating cutter adapted to sever the solder and deliver it into the open chamber, mechanism whereby the cutter is actuated, consisting of a revolving cam or eccentric and shaft, arms projecting from said shaft and a reciprocating bar with a lug or projection adapted to engage the arms and partially rotate the shaft at each reciprocation.

24. In a can making machine, mechanism for supplying the sheets or blanks to be formed into can bodies, a reciprocating carrier for receiving said sheets singly and successively, mechanism for actuating the feeder and carrier, consisting of a horizontally reciprocating bar connected therewith at one end, and with the crank or eccentric upon the main driving shaft, reciprocating carriers whereby the sheets and cans are intermittently advanced along the horn, and an eccentric or crank with connecting rod whereby said carriers are actuated independently of the feed and supply carrier.

25. In a can making machine, the hollow cylindrical extension of the horn about which the can bodies are formed, mechanism by which the outside and inside of the seams are soldered simultaneously, wipers consisting of fibrous cloth or fabric, and clamping plates between which the fabric is secured above and below the seam, whereby the latter passes between the wipers after having been soldered.

26. The clamping plates having vertical slots made through them adapted to receive fibrous wipers, adjusting screws by which the plates are moved over each other to clamp the wipers, and set screws passing through slots in one of the plates which allow of the adjustment, whereby the plates are locked together after the wipers have been secured between them.

27. The solder wipers for the exterior of the seam, consisting of plates having vertical slots through which the fibrous wiping material is inserted, screws by which the plates are adjusted upon each other to clamp the material, and set screws for holding the plates together, said plates having openings made through them in line with the seam, whereby any surplus solder falls through the plates and away from the can.

28. In a can making machine, the mechanism for applying the heads to the ends of the cans and crimping the heads thereon, consisting of the cylindrical extension of the horn over which the can bodies are moved, interior conical segments by which the can body is expanded, a carrier adapted to receive can heads and reciprocate in line with the can body whereby the head is applied to the can body, and a movable plunger whereby the cans are expanded and the head crimped upon the can end after application, in combination with a locking latch, whereby the plunger and carrier are rigidly connected together until after the head has been applied to the can, and a means for disengaging the latch to allow the further advance of the plunger after the head has been applied for the purpose of crimping it upon the can end.

29. A can making apparatus consisting of an automatically operating feeder, a former and a cylindrical horn into which it merges, over which the sheet is intermittently moved to form interlocking hooks, and lock and close them to form a side seamed cylinder, soldering irons and wipers between which the seam is passed, a continuation of the horn over which the can passes, without change of form, and a mechanism whereby the head is applied and crimped thereon.

In witness whereof I have hereunto set my hand.

ROBERT D. HUME.

Witnesses:
S. H. NOURSE,
H. F. ASCHECK.